US012399022B2

(12) United States Patent
Kato

(10) Patent No.: US 12,399,022 B2
(45) Date of Patent: Aug. 26, 2025

(54) NAVIGATION APPARATUS

(71) Applicant: SUBARU CORPORATION, Tokyo (JP)

(72) Inventor: Hideaki Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 28 days.

(21) Appl. No.: 18/433,129

(22) Filed: Feb. 5, 2024

(65) Prior Publication Data

US 2025/0251249 A1    Aug. 7, 2025

(30) Foreign Application Priority Data

Feb. 14, 2023    (JP) .................................. 2023-021209

(51) Int. Cl.
*G01C 21/34*    (2006.01)
*B60L 58/13*    (2019.01)
*G06Q 10/02*    (2012.01)

(52) U.S. Cl.
CPC .......... *G01C 21/3469* (2013.01); *B60L 58/13* (2019.02); *G01C 21/3415* (2013.01); *G06Q 10/02* (2013.01); *B60L 2240/60* (2013.01); *B60L 2260/52* (2013.01)

(58) Field of Classification Search
CPC ............ G01C 21/3415; G01C 21/3461; G01C 21/3469; G06Q 10/02; B60L 58/13; B60L 58/14; B60L 2240/60; B60L 2260/52; B60L 2260/54

See application file for complete search history.

(56) References Cited

U.S. PATENT DOCUMENTS

| 12,194,880 B1 * | 1/2025 | Yang ...................... B60L 53/67 |
| 2008/0319596 A1 * | 12/2008 | Yamada .................. B60L 50/61 |
| | | 903/930 |
| 2011/0029168 A1 * | 2/2011 | Talberg ................. B60W 20/12 |
| | | 903/903 |
| 2011/0032110 A1 * | 2/2011 | Taguchi .................... B60L 3/12 |
| | | 340/636.1 |
| 2012/0161692 A1 * | 6/2012 | Kobayashi .............. B60L 58/13 |
| | | 320/109 |

(Continued)

FOREIGN PATENT DOCUMENTS

| DE | 102018215722 A1 * | 3/2020 |
| JP | 2014032041 A * | 2/2014 |
| JP | 2020-186951 A | 11/2020 |

*Primary Examiner* — John M Zaleskas

(74) *Attorney, Agent, or Firm* — Rimon P.C.

(57) ABSTRACT

A navigation apparatus includes a remaining charge amount detector, a guidance plan calculator, and a reservation data obtainer. The remaining charge amount detector is configured to detect a remaining charge amount of a storage battery of a vehicle. The guidance plan calculator is configured to calculate a guidance route along which a charging facility is set as a stopover point and a charge amount to be charged at the charging facility. The reservation data obtainer is configured to acquire data on a reservation of the charging facility positioned at a destination. The guidance plan calculator is configured to calculate the guidance route and the charge amount, by changing, based on data on the reservation, the remaining charge amount to be maintained at the time when the vehicle arrives at the destination.

5 Claims, 3 Drawing Sheets

(56) References Cited

U.S. PATENT DOCUMENTS

| | | | | |
|---|---|---|---|---|
| 2012/0290506 | A1* | 11/2012 | Muramatsu | G01C 21/3679 701/400 |
| 2013/0282718 | A1* | 10/2013 | Sagata | B60L 3/12 707/736 |
| 2013/0345976 | A1* | 12/2013 | Li | G01C 21/3476 701/533 |
| 2014/0129139 | A1* | 5/2014 | Ellison | G06Q 30/0251 701/533 |
| 2014/0163877 | A1* | 6/2014 | Kiyama | G01C 21/3469 701/533 |
| 2014/0257884 | A1* | 9/2014 | Kyoung | G06Q 10/02 705/5 |
| 2015/0198459 | A1* | 7/2015 | MacNeille | G01C 21/3697 701/22 |
| 2015/0286965 | A1* | 10/2015 | Amano | B60L 53/68 705/5 |
| 2017/0120761 | A1* | 5/2017 | Kapadia | G07F 15/005 |
| 2017/0343366 | A1* | 11/2017 | You | G01C 21/343 |
| 2019/0275902 | A1* | 9/2019 | Katanoda | G01C 21/3617 |
| 2020/0003571 | A1* | 1/2020 | Shirakawa | G06Q 50/10 |
| 2020/0072626 | A1* | 3/2020 | Kumar | B60L 53/32 |
| 2020/0355516 | A1* | 11/2020 | Nakamura | G01C 21/3469 |
| 2021/0086651 | A1* | 3/2021 | Maeda | B60L 53/66 |
| 2021/0221243 | A1* | 7/2021 | Kawamoto | G06Q 50/06 |
| 2021/0293558 | A1* | 9/2021 | Namiki | G06Q 10/02 |
| 2022/0012647 | A1* | 1/2022 | Lee | B60L 53/305 |
| 2022/0050143 | A1* | 2/2022 | Maeda | G01R 31/382 |
| 2023/0194282 | A1* | 6/2023 | Suzuki | B60L 53/65 701/22 |
| 2023/0234468 | A1* | 7/2023 | Maeda | G06Q 50/40 320/109 |
| 2024/0027214 | A1* | 1/2024 | Yang | G01C 21/3469 |
| 2024/0118100 | A1* | 4/2024 | Miyata | B60W 50/14 |
| 2024/0142247 | A1* | 5/2024 | Ropel | B60L 58/13 |
| 2024/0157839 | A1* | 5/2024 | Miyazaki | G06Q 30/0207 |
| 2024/0202608 | A1* | 6/2024 | Kato | G01C 21/3469 |
| 2024/0203253 | A1* | 6/2024 | Kato | B60L 58/13 |
| 2024/0295407 | A1* | 9/2024 | Lei | G01C 21/3469 |
| 2024/0343150 | A1* | 10/2024 | Kato | B60L 53/66 |
| 2024/0428144 | A1* | 12/2024 | Herron | G06Q 10/02 |

* cited by examiner

| TYPES OF DATA | DETAILS OF DATA | DESCRIPTION |
|---|---|---|
| DATA ON POSITION OF CHARGING FACILITY | LOCATION, LATITUDE, AND LONGITUDE | DATA DIRECTED TO DETERMINE WHETHER CHARGING FACILITY IS PRESENT AT DESTINATION DATA DIRECTED TO DECIDE CHARGING FACILITY TO BE SET AS STOPOVER POINT |
| DATA ON CHARGING FACILITY | POWER SUPPLY TYPE/POWER SUPPLY CAPABILITY/DATA ON AVAILABILITY OF QUICK CHARGE CHARGING TYPE (WIRELESS OR WIRED)/ NUMBER OF CHARGERS, ETC. | DATA DIRECTED TO CONFIRM WHETHER THERE IS CHARGER COMPATIBLE WITH VEHICLE |
| DATA ON RESERVATION OF CHARGING FACILITY | DATA ON RESERVATION FOR EACH AVAILABLE CHARGER OWNED BY CHARGING FACILITY ID OF PERSON WHO MADE RESERVATION/ RESERVATION TIME (DATE, STARTING TIME, AND ENDING TIME) | DATA DIRECTED TO CONFIRM STATUS OF RESERVATION OF CHARGING FACILITY |

FIG. 2

NAVIGATION APPARATUS

CROSS-REFERENCE TO RELATED APPLICATIONS

The present application claims priority from Japanese Patent Application No. 2023-021209 filed on Feb. 14, 2023, the entire contents of which are hereby incorporated by reference.

BACKGROUND

The disclosure relates to a navigation apparatus.

A vehicle such as an electric vehicle or a plug-in hybrid vehicle having a storage battery chargeable by an external power source has become popular in recent years from a viewpoint of environmental protection.

Upon long-distance driving using the vehicle such as the electric vehicle, it is necessary to travel through a charging facility to charge the storage battery and travel to a destination.

For example, Japanese Unexamined Patent Application Publication (JP-A) No. 2020-186951 discloses a technique in which, upon deciding a guidance plan to a destination set by a user of an electric vehicle, whether there is a charging facility at the destination is determined, and the guidance plan is changed based on a result of the determination. The guidance plan includes a guidance route and a charge amount to be charged at the charging facility set at a stopover point.

SUMMARY

An aspect of the disclosure provides a navigation apparatus that includes a remaining charge amount detector, a guidance plan calculator, and a reservation data obtainer. The remaining charge amount detector is configured to detect a remaining charge amount of a storage battery of a vehicle. The guidance plan calculator is configured to calculate a guidance route along which a charging facility is set as a stopover point and a charge amount to be charged at the charging facility, based on a destination set by a user, the remaining charge amount, and the remaining charge amount to be maintained at time when the vehicle arrives at the destination. The reservation data obtainer is configured to acquire data on a reservation of the charging facility positioned at the destination. The guidance plan calculator is configured to calculate the guidance route and the charge amount, by changing, based on the data on the reservation, the remaining charge amount to be maintained at the time when the vehicle arrives at the destination.

An aspect of the disclosure provides a navigation apparatus that includes one or more processors and one or more memories. The one or more memories are communicably coupled to the one or more processors. The one or more processors are configured to: detect a remaining charge amount of a storage battery of a vehicle; calculate a guidance route along which a charging facility is set as a stopover point and a charge amount to be charged at the charging facility, based on a destination set by a user, the remaining charge amount, and the remaining charge amount to be maintained at time when the vehicle arrives at the destination; acquire data on a reservation of the charging facility positioned at the destination; and calculate the guidance route and the charge amount, by changing, based on the data on the reservation, the remaining charge amount to be maintained at the time when the vehicle arrives at the destination.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIG. 2 is a diagram illustrating pieces of data to be acquired by a reservation data obtainer of the navigation apparatus illustrated in FIG. 1.

DETAILED DESCRIPTION

Figure 1:
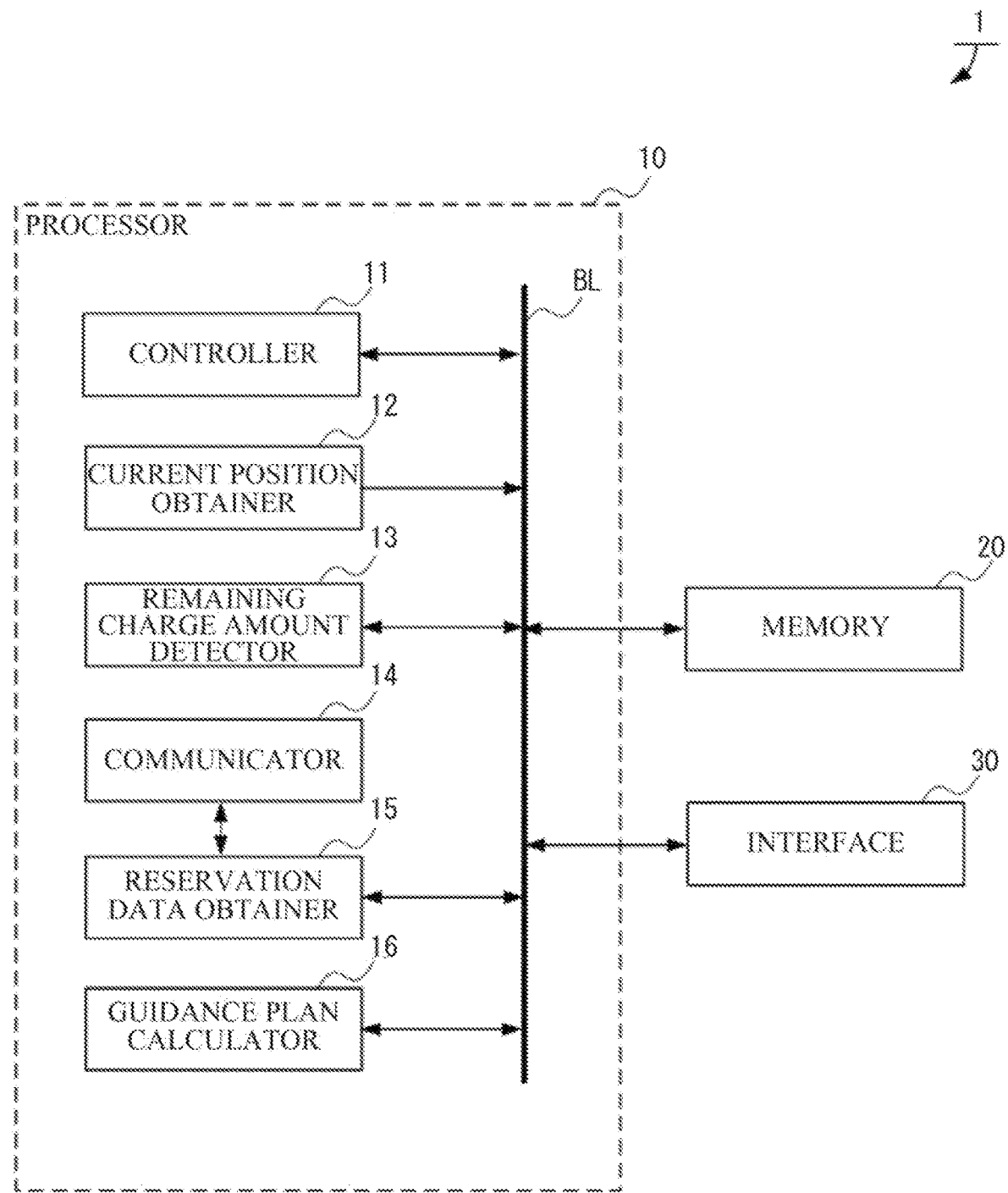
FIG. 1 is a diagram illustrating a configuration of a navigation apparatus according to one example embodiment of the disclosure.

In general, the number of chargers provided in a charging facility is limited. Accordingly, it is necessary to make a reservation of usage of the charging facility. If there is no reservation of usage, there is a possibility that it is not possible to perform charging.

A technique described in JP-A No. 2020-186951 does not confirm the reservation of usage of a charging facility positioned at a destination, which makes it unable to calculate a guidance plan that takes into consideration a case where it is not possible to use the charging facility.

It is desirable to provide a navigation apparatus that makes it possible to calculate a guidance plan that takes into consideration a status of a reservation of usage of a charging facility.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Example Embodiment

Figure 3:
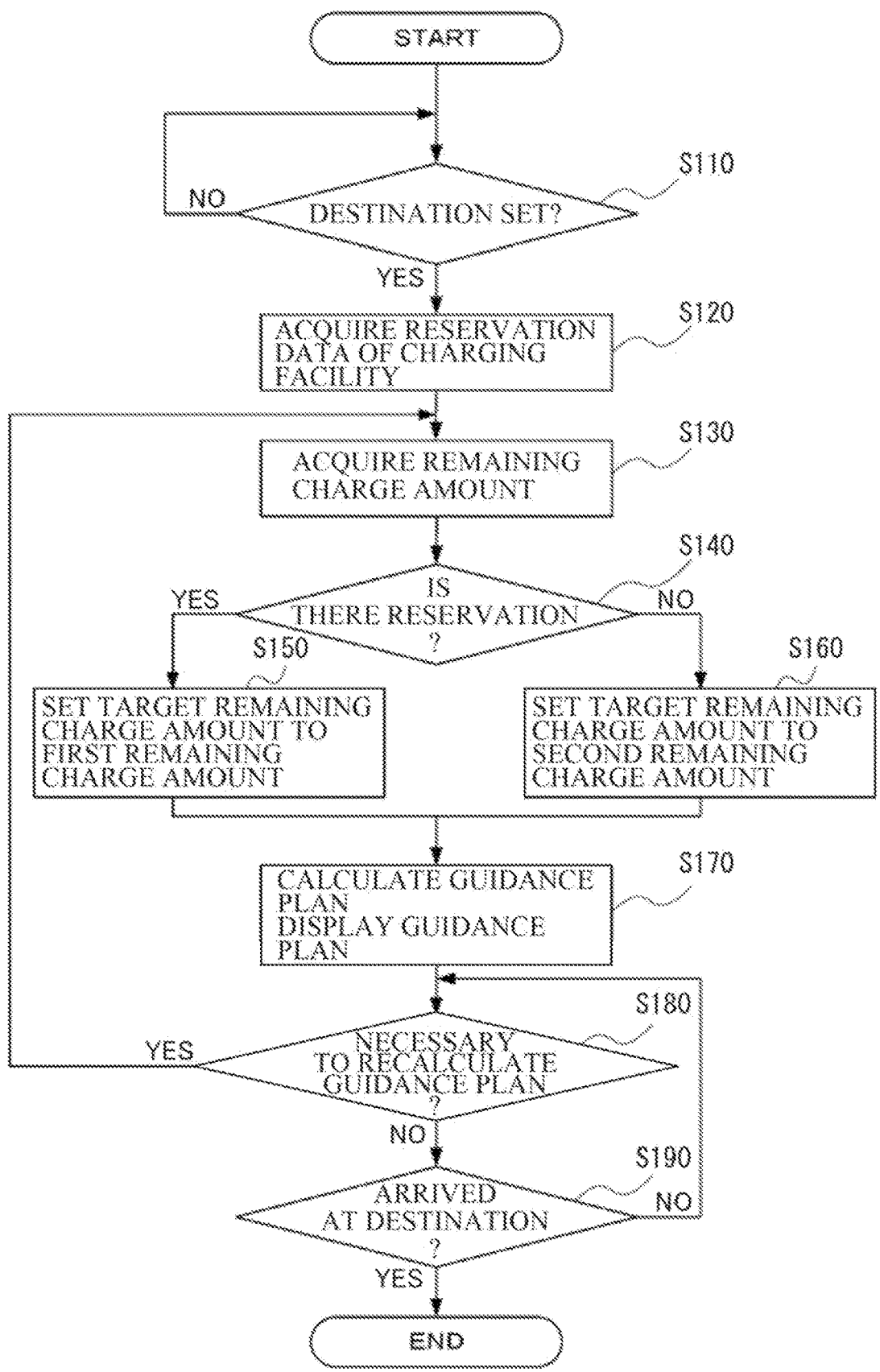
FIG. 3 is a flowchart illustrating a process to be performed by the navigation apparatus illustrated in FIG. 1.

A navigation apparatus 1 according to an example embodiment will be described with reference to FIGS. 1 to 3.

[Configuration of Navigation Apparatus 1]

Referring to FIG. 1, the navigation apparatus 1 according to the example embodiment may include a processor 10, a memory 20, and an interface 30.

Details of the processor 10 will be described later.

The memory 20 may be or include devices including, for example, a read-only memory (ROM) and a random-access memory (RAM). The ROM may store data such as a control program or map data. The RAM may store, for example, data received from the processor 10.

The interface 30 may be or include, for example, a touch panel stacked on a liquid crystal panel. The interface 30 may acquire information inputted from a user and display information received from the processor 10.

In the example embodiment, the interface 30 may acquire information on a touch operation performed by the user, and display, for example, a guidance route to a destination.

[Configuration of Processor 10]

The processor 10 may include a controller 11, a current position obtainer 12, a remaining charge amount detector 13, a communicator 14, a reservation data obtainer 15, and a guidance plan calculator 16.

The respective devices of the processor 10 and the memory 20 may transmit and receive various types of data via a bus line BL.

The controller 11 may control the navigation apparatus 1 as a whole in accordance with the control program stored in the memory 20.

For example, the controller 11 may acquire, for example, data on the destination set by the user.

The current position obtainer 12 may acquire data on a current position of an own vehicle.

For example, the current position obtainer 12 may acquire the current position of the own vehicle that includes the navigation apparatus 1, based on an electric wave received from global positioning system (GPS) satellites.

The current position obtainer 12 may acquire the current position data of the own vehicle, and store the acquired current position data in the memory 20.

The remaining charge amount detector 13 detects a remaining charge amount of a storage battery of the own vehicle.

The remaining charge amount detector 13 may detect the remaining charge amount of the storage battery and store a result of the detection in the memory 20.

The communicator 14 may be, for example, a known wireless communication module. The communicator 14 may serve as an interface for the later-described reservation data obtainer 15 to acquire data from a server coupled to the Internet network.

The reservation data obtainer 15 acquires data on a reservation of a charging facility positioned at the destination.

The charging facility may be any facility in which a charger that allows for charging of the storage battery of the own vehicle such as an electric vehicle is installed.

The reservation data obtainer 15 may be coupled to, for example, an unillustrated charging facility reservation management server via the communicator 14, and acquire the reservation data of the charging facility positioned at the destination set by the user.

A description is given here of the charging facility reservation management server.

Referring to FIG. 2, the charging facility reservation management server may contain, for example, data on location of each charging facility, data on the charging facility such as a power supply type of the charger or the number of chargers provided at the charging facility, and the reservation data of each charging facility.

For example, the user may make a reservation for usage of the charging facility by coupling, to the charging facility reservation management server, a smartphone on which an application directed for charging facility reservation is installed, confirming the reservation data of the charging facility desired to be used, and designating a time during which the charging facility is available.

The charging facility reservation management server may store, for example, individual ID data of the user who has made the usage reservation and the data on the usage reservation of the charging facility in association with each other. The data on the usage reservation of the charging facility may include the name of the charging facility to be used and the usage time of the charging facility.

The reservation data obtainer 15 may be coupled to the charging facility reservation management server and determine whether the charging facility is positioned at the destination set by the user. The reservation data obtainer 15 may acquire the reservation data of the charging facility if the charging facility is positioned at the destination, and store the acquired reservation data in the memory 20.

If there is no charging facility at the destination set by the user, the reservation data obtainer may transmit, to the later-described guidance plan calculator 16, data indicating that there is no charging facility at the destination set by the user.

The guidance plan calculator 16 calculates a guidance route along which the charging facility is set as the stopover point and the charge amount to be charged at the charging facility set as the stopover point, based on the destination set by the user, the remaining charge amount, and the remaining charge amount to be maintained at the time when the own vehicle arrives at the destination. Hereinafter, the guidance route and the charge amount at the charging facility may be referred to as a "guidance plan".

In the example embodiment, the guidance plan calculator 16 changes, based on the reservation data acquired by the reservation data obtainer 15, the remaining charge amount to be maintained at the time when the own vehicle arrives at the destination to thereby calculate the guidance plan. Hereinafter, the remaining charge amount to be maintained at the time when the own vehicle arrives at the destination may be referred to as a "target remaining charge amount".

An example of a method of calculating the guidance plan to be calculated by the guidance plan calculator 16 will be described below.

For example, the guidance plan calculator 16 may calculate a distance in which the own vehicle is able to cruise (hereinafter may be referred to as a "cruising distance"), based on the remaining charge amount of the storage battery and an actual value of the cruising distance per external charge amount of 1 kwh. The guidance plan calculator 16 may calculate the guidance route, to the destination, along which the charging facility positioned in the cruising distance is set as the stopover point.

The guidance plan calculator 16 may calculate the charge amount to be charged at the charging facility set as the stopover point, based on an amount of electric power necessary for the own vehicle to travel along the calculated guidance route to the destination, the current remaining charge amount, and the target remaining charge amount.

In some embodiments, when the reservation of the charging facility positioned at the destination is confirmed based on the reservation data, the guidance plan calculator 16 may calculate the guidance route along which the remaining charge amount at the time of the arrival at the destination is maintainable so as to be equal to or greater than a first remaining charge amount. In some embodiments, when the reservation of the charging facility positioned at the destination is not confirmed based on the reservation data, the guidance plan calculator 16 may calculate the charge amount and the guidance route along which the remaining charge amount at the time of the arrival at the destination is maintainable so as to be equal to or greater than a second remaining charge amount. The second remaining charge amount may be greater than the first remaining charge amount.

For example, the guidance plan calculator 16 may refer to the individual ID of the user stored in advance in the memory 20 and the reservation data acquired by the reservation data obtainer 15, and confirm whether there is a reservation associated with the individual ID of the user.

If the reservation associated with the individual ID of the user is confirmed based on the reservation data acquired by the reservation data obtainer 15, the guidance plan calculator 16 may set, for example, the charge amount of 20% of the full charge, i.e., the charge amount of 100%, as the first remaining charge amount. If the reservation data of the charging facility positioned at the destination is not confirmed or if the data indicating that there is no charging facility at the destination is received, the guidance plan calculator 16 may set the charge amount of 30% of the full charge, i.e., the charge amount of 100%, as the second remaining charge amount.

In other words, if the guidance plan is so calculated that the charge amount of 20% of the full charge is maintainable at the time of the arrival at the destination, it is possible to reach the destination even when the power consumption of the own vehicle increases due to a factor such as a traffic situation. Accordingly, the guidance plan calculator 16 may set, for example, the charge amount of 20% of the full charge as the first remaining charge amount.

If the guidance plan is so calculated that the charge amount of 30% of the full charge is maintainable at the time of the arrival at the destination, it is possible to reach the destination and travel to any charging facility positioned in the vicinity of the destination, even when the power consumption of the own vehicle increases due to a factor such as the traffic situation. Accordingly, the guidance plan calculator 16 may set, for example, the charge amount of 30% of the full charge as the second charge remaining amount.

The guidance plan calculator 16 may calculate the guidance route, to the destination, along which the charging facility is set as the stopover point and the charge amount at the charging facility, based on pieces of data including, for example, the destination data, the current position of the own vehicle, the remaining charge amount of the own vehicle, the set target remaining charge amount (e.g., the first remaining charge amount or the second remaining charge amount), and the position data of the charging facility. The guidance plan calculator 16 may store a result of the calculation in the memory 20.

The guidance plan calculator 16 may transmit the calculation result to the interface 30, and cause information on the guidance plan to the destination to be displayed on the interface 30.

In some embodiments, when the guidance route to the destination is to be recalculated while the own vehicle travels along the guidance route, the guidance plan calculator 16 may acquire the latest remaining charge amount from the memory 20, and recalculate the guidance route along which the charging facility is set as the stopover point and the charge amount at the charging facility set as the stopover point.

For example, the guidance plan calculator 16 may determine that the recalculation of the guidance plan is necessary when the controller 11 detects an instruction to stop at a sightseeing spot positioned around the guidance route while traveling along the guidance route. Accordingly, the guidance plan calculator 16 may acquire the latest remaining charge amount from the memory 20, and calculate the guidance plan again based on pieces of data including, for example, the current position data, stop spot data, the destination data, and the target remaining charge amount determined based on the reservation data of the charging facility positioned at the destination. The guidance plan calculator 16 may store a result of the calculation in the memory 20.

The guidance plan calculator 16 may transmit the calculation result to the interface 30, and cause information on the guidance plan to the destination to be displayed on the interface 30.

[Process of Navigation Apparatus 1]

An example process to be performed by the navigation apparatus 1 will be described with reference to FIG. 3.

The controller 11 may determine whether the user has set the destination (step S110).

If the controller 11 determines that the user has not set the destination ("NO" in step S110), the controller 11 may return the process and shift to a standby state.

If the controller 11 determines that the user has set the destination ("YES" in step S110), the reservation data obtainer 15 may acquire the reservation data of the charging facility positioned at the destination set by the user (step S120), and shift the process to step S130.

The remaining charge amount detector 13 may acquire the remaining charge amount of the own vehicle (step S130), and shift the process to step S140.

The guidance plan calculator 16 may confirm the reservation data acquired in step S120, and determine whether there is a reservation of the charging facility (step S140).

If the guidance plan calculator 16 determines that the charging facility is reserved ("YES" in step S140), the guidance plan calculator 16 may set the target remaining charge amount to the first remaining charge amount (step S150).

If the guidance plan calculator 16 determines that there is no reservation of the charging facility ("NO" in step S140), the guidance plan calculator 16 may set the target remaining charge amount to the second remaining charge amount (step S160).

The guidance plan calculator 16 may calculate the guidance plan, based on the destination data, the current position data, the remaining charge amount, and the target remaining charge amount that is set based on the reservation data of the charging facility, and cause the interface 30 to display the calculated guidance plan (step S170).

The controller 11 may determine whether the recalculation of the guidance plan is necessary (step S180).

If the controller 11 determines that it is necessary to recalculate the guidance plan ("YES" in step S180), the controller 11 may return the process to step S130 and continue the process.

If the controller 11 determines that it is not necessary to recalculate the guidance plan ("NO" in step S180), the controller 11 may determine whether the own vehicle has arrived at the destination by referring to the data on the current position of the own vehicle and the destination data (step S190).

If the controller 11 determines that the own vehicle has not arrived at the destination ("NO" in step S190), the controller 11 may return the process to step S180 and continue the process.

If the controller 11 determines that the own vehicle has arrived at the destination ("YES" in step S190), the controller 11 may end the process.

Workings and Example Effects

The processor 10 of the navigation apparatus 1 according to the example embodiment includes the remaining charge amount detector 13, the guidance plan calculator 16, and the reservation data obtainer 15. The remaining charge amount detector 13 is configured to detect the remaining charge amount of the storage battery of the own vehicle. The guidance plan calculator 16 is configured to calculate the guidance route along which the charging facility is set as the stopover point, based on the destination set by the user, the remaining charge amount, and the remaining charge amount to be maintained at the time when the own vehicle arrives at the destination. The reservation data obtainer 15 is configured to acquire the reservation data of the charging facility positioned at the destination. The guidance plan calculator 16 is configured to calculate the guidance route and the charge amount to be charged at the charging facility set as the stopover point, by changing, based on the reservation data, the remaining charge amount to be maintained at the time when the own vehicle arrives at the destination.

Even when the charging facility exists at the destination, there is a possibility that the storage battery of the own vehicle is not chargeable if the reservation of usage of the charging facility is not made. Accordingly, the guidance plan calculator 16 may confirm the presence of the reservation of the charging facility positioned at the destination, and changes, based on a result of the confirmation, the remaining charge amount to be maintained at the time of the arrival at the destination to thereby calculate the guidance route and the charge amount at the charging facility set as the stopover point.

There is a possibility that the storage battery of the own vehicle is not chargeable if the reservation of usage of the charging facility is not made even when the charging facility exists at the destination.

Accordingly, the guidance plan calculator 16 may confirm the presence of the reservation of the charging facility positioned at the destination, and changes, based on a result of the confirmation, the remaining charge amount to be maintained at the time of the arrival at the destination to thereby calculate the guidance route and the charge amount at the charging facility set as the stopover point.

Thus, the guidance plan is calculated that takes into consideration the status of the reservation of the usage of the charging facility positioned at the destination set by the user. This configuration helps to allow the user to drive the own vehicle without worrying about the remaining charge amount.

In some embodiments, the guidance plan calculator 16 may be configured to calculate the guidance route along which the remaining charge amount at the time of the arrival at the destination is maintainable so as to be equal to or greater than the first remaining charge amount when the reservation of the charging facility positioned at the destination is confirmed based on the reservation data, and may be configured to calculate the guidance plan that makes it possible to maintain the remaining charge amount at the time of the arrival at the destination that is equal to or greater than the second remaining charge amount when the reservation of the charging facility positioned at the destination is not confirmed based on the reservation data. The second remaining charge amount may be greater than the first remaining charge amount.

It is possible to reliably perform the charging at the charging facility positioned at the destination when the reservation of the charging facility positioned at the destination is confirmed. In this case, it is not necessary to maintain in excess the remaining charge amount to be maintained at the time of the arrival at the destination.

Thus, it is possible to avoid the excessive charging (e.g., charging time/number of times of charging) to be performed at the charging facility set at the stopover point, when the reservation of the charging facility positioned at the destination is confirmed. Accordingly, the above configuration helps to allow the user to quickly arrive at the destination.

It is necessary to maintain an extra amount of electric power for the own vehicle to travel to the charging facility in the vicinity of the destination when the reservation of the charging facility positioned at the destination is not confirmed. In this case, the guidance plan calculator 16 may so calculate the guidance plan that the remaining charge amount at the time of the arrival at the destination is maintainable so as to be equal to or greater than the second remaining charge amount greater than the first remaining charge amount.

Thus, it is possible to maintain the remaining charge amount for the own vehicle to travel to the charging facility in the vicinity of the destination when the reservation of the charging facility positioned at the destination is not confirmed. Accordingly, the above configuration helps to allow the user to drive the own vehicle without worrying about the remaining charge amount.

In some embodiments, when the guidance route to the destination is to be recalculated while the own vehicle travels along the guidance route, the guidance plan calculator 16 may be configured to acquire again the remaining charge amount from the remaining charge amount detector 13, and recalculate the guidance route and the charge amount.

It is necessary to recalculate the guidance route when a stop to, for example, a tourist spot positioned around a route to the destination is added by the user. In this case, the guidance plan calculator 16 may calculate the guidance plan again, based on the remaining charge amount acquired again from the remaining charge amount detector 13 and the target remaining charge amount determined based on the reservation data of the charging facility.

Thus, the target remaining charge amount determined based on the reservation data of the charging facility positioned at the destination is maintained even when the guidance plan is recalculated during traveling. Accordingly, the above configuration helps to allow the user to drive the own vehicle without worrying about the remaining charge amount.

MODIFICATION EXAMPLES

In some embodiments, the processes to be performed by the reservation data obtainer 15 and the guidance plan calculator 16 of the navigation apparatus 1 according to the example embodiment may be executed by a server.

For example, the navigation apparatus 1 may transmit, to the server, the data on the destination set by the user, the current position data acquired by the current position obtainer 12, and the remaining charge amount detected by the remaining charge amount detector 13. The server may calculate the guidance plan, based on the respective pieces of data received from the navigation apparatus 1 and the data acquired from the charging facility reservation management server, and transmit the calculated guidance plan to the navigation apparatus 1.

This configuration helps to reduce the power consumption of the navigation apparatus 1 and a memory size of the memory 20.

In some embodiments, it is possible to implement the navigation apparatus 1 of the example embodiment of the disclosure by recording the process to be executed by a processor such as the controller 11, the current position obtainer 12, the remaining charge amount detector 13, the communicator 14, the reservation data obtainer 15, or the guidance plan calculator 16 on a non-transitory recording medium readable by a computer system, and causing the computer system to load the program recorded on the non-transitory recording medium onto the memory to execute the program.

The computer system as used herein may encompass an operating system (OS) and a hardware such as a peripheral device.

In addition, when the computer system utilizes a World Wide Web (WWW) system, the "computer system" may encompass a website providing environment (or a website displaying environment).

The program may be transmitted from a computer system that contains the program in a storage device or the like to another computer system via a transmission medium or by a carrier wave in a transmission medium.

The "transmission medium" that transmits the program may refer to a medium having a capability to transmit data, including a network (e.g., a communication network) such as the Internet and a communication link (e.g., a communication line) such as a telephone line.

Further, the program may be directed to implement a part of the operation described above. The program may be a so-called differential file (differential program) configured to implement the operation by a combination of a program already recorded on the computer system.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

One or more of the controller 11, the current position obtainer 12, the remaining charge amount detector 13, the communicator 14, the reservation data obtainer 15, and the guidance plan calculator 16 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of one or more of the controller 11, the current position obtainer 12, the remaining charge amount detector 13, the communicator 14, the reservation data obtainer 15, and the guidance plan calculator 16. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of one or more of the controller 11, the current position obtainer 12, the remaining charge amount detector 13, the communicator 14, the reservation data obtainer 15, and the guidance plan calculator 16 illustrated in FIG. 1.

The invention claimed is:

1. A navigation apparatus comprising:
a remaining charge amount detector configured to detect a remaining charge amount of a storage battery of a vehicle;
a guidance plan calculator configured to calculate a guidance route along which a charging facility is set as a stopover point and a charge amount to be charged at the charging facility, based on a destination set by a user, the remaining charge amount, and the remaining charge amount to be maintained at a time when the vehicle arrives at the destination; and
a reservation data obtainer configured to acquire data on a reservation of the charging facility positioned at the destination, wherein
the guidance plan calculator is configured to calculate the guidance route and the charge amount, by changing, based on the data on the reservation, the remaining charge amount to be maintained at the time when the vehicle arrives at the destination.

2. The navigation apparatus according to claim 1, wherein the guidance plan calculator is configured to
when the reservation of the charging facility positioned at the destination is confirmed based on the data on the reservation, calculate the charge amount and the guidance route along which the remaining charge amount at the time of the arrival at the destination is maintainable so as to be equal to or greater than a first remaining charge amount, and
calculate the charge amount and the guidance route along which the remaining charge amount at the time of the arrival at the destination is maintainable so as to be equal to or greater than a second remaining charge amount, when the reservation of the charging facility positioned at the destination is not confirmed based on the data on the reservation, the second remaining charge amount being greater than the first remaining charge amount.

3. The navigation apparatus according to claim 2, wherein, the guidance plan calculator is configured to, when the guidance route to the destination is to be recalculated while the vehicle travels along the guidance route, acquire again the remaining charge amount from the remaining charge amount detector, and recalculate the guidance route and the charge amount.

4. The navigation apparatus according to claim 1, wherein, the guidance plan calculator is configured to, when the guidance route to the destination is to be recalculated while the vehicle travels along the guidance route, acquire again the remaining charge amount from the remaining charge amount detector, and recalculate the guidance route and the charge amount.

5. A navigation apparatus comprising:
one or more processors; and
one or more memories communicably coupled to the one or more processors, wherein
the one or more processors are configured to:
detect a remaining charge amount of a storage battery of a vehicle;
calculate a guidance route along which a charging facility is set as a stopover point and a charge amount to be charged at the charging facility, based on a destination set by a user, the remaining charge amount, and the remaining charge amount to be maintained at time when the vehicle arrives at the destination;
acquire data on a reservation of the charging facility positioned at the destination; and
calculate the guidance route and the charge amount, by changing, based on the data on the reservation, the remaining charge amount to be maintained at the time when the vehicle arrives at the destination.

* * * * *